United States Patent
Hung et al.

(10) Patent No.: US 9,507,666 B2
(45) Date of Patent: Nov. 29, 2016

(54) MEMORY CHIPS AND DATA PROTECTION METHODS

(71) Applicant: VIA TECHNOLOGIES, INC., New Taipei (TW)

(72) Inventors: Yao-Shun Hung, New Taipei (TW); Chin-Yin Tsai, New Taipei (TW); Yi-Lin Lai, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 116 days.

(21) Appl. No.: 14/561,612

(22) Filed: Dec. 5, 2014

(65) Prior Publication Data

US 2015/0193308 A1 Jul. 9, 2015

(30) Foreign Application Priority Data

Jan. 6, 2014 (TW) ............................. 103100330 A

(51) Int. Cl.
*G06F 9/24* (2006.01)
*G06F 15/177* (2006.01)
*G06F 11/14* (2006.01)
*G06F 9/44* (2006.01)
*G06F 11/07* (2006.01)

(52) U.S. Cl.
CPC ........... *G06F 11/1417* (2013.01); *G06F 9/441* (2013.01); *G06F 11/073* (2013.01); *G06F 11/076* (2013.01); *G06F 11/0751* (2013.01)

(58) Field of Classification Search
CPC ......................... G06F 11/1417; G06F 11/0751
USPC ......................................................... 713/1, 2
See application file for complete search history.

(56) References Cited

U.S. PATENT DOCUMENTS

| | | | | |
|---|---|---|---|---|
| 5,367,688 A | | 11/1994 | Croll | |
| 5,822,581 A | * | 10/1998 | Christeson | G06F 15/7814 712/E9.007 |
| 5,913,057 A | * | 6/1999 | Labatte | G06F 12/1466 711/E12.094 |
| 6,684,353 B1 | * | 1/2004 | Parker | G11C 29/44 714/718 |
| 7,234,051 B2 | * | 6/2007 | Munguia | G06F 9/441 713/1 |
| 7,454,557 B2 | * | 11/2008 | Chang | G06F 9/4403 710/200 |

(Continued)

FOREIGN PATENT DOCUMENTS

| | | |
|---|---|---|
| CN | 1553349 | 12/2004 |
| CN | 1902583 | 1/2007 |

(Continued)

OTHER PUBLICATIONS

English language machine translation of TW 200737003 (published Oct. 1, 2007).

(Continued)

*Primary Examiner* — Mark Connolly
(74) *Attorney, Agent, or Firm* — McClure, Qualey & Rodack, LLP

(57) ABSTRACT

A memory chip coupled to a host includes a memory and a controller. Multiple boot images having the same content are pre-loaded in the memory. The controller is coupled to the memory for processing data transmission between the memory chip and the host. The controller further determines whether the memory chip enters a boot mode for the first time. When the memory chip enters the boot mode for the first time, the controller accesses the memory so as to obtain a correct boot image from the boot images and transmits the correct boot image to the host.

18 Claims, 9 Drawing Sheets

(56) References Cited

U.S. PATENT DOCUMENTS

| | | | |
|---|---|---|---|
| 7,962,777 B2 | 6/2011 | Gonzalez et al. | |
| 7,999,578 B2 | 8/2011 | Takahashi et al. | |
| 8,504,904 B2* | 8/2013 | Aston | G06F 11/1004 714/807 |
| 9,208,041 B2* | 12/2015 | Bennah | G06F 8/63 |
| 2003/0005277 A1* | 1/2003 | Harding | G06F 11/1417 713/2 |
| 2008/0222409 A1* | 9/2008 | Chung | G06F 9/4403 713/2 |
| 2008/0288767 A1* | 11/2008 | Wang | G06F 11/1417 713/2 |
| 2011/0055623 A1* | 3/2011 | Kim | G06F 11/141 714/710 |
| 2012/0166706 A1 | 6/2012 | Pua et al. | |

FOREIGN PATENT DOCUMENTS

| | | |
|---|---|---|
| TW | 200737003 | 10/2007 |
| TW | 200912350 | 3/2009 |
| TW | 201007577 | 2/2010 |
| TW | 201227304 | 7/2012 |

OTHER PUBLICATIONS

English language machine translation of TW 200912350 (published Mar. 16, 2009).
English language machine translation of TW 201007577 (published Feb. 16, 2010).
English language machine translation of TW 201227304 (published Jul. 1, 2012).

* cited by examiner

MEMORY CHIPS AND DATA PROTECTION METHODS

CROSS REFERENCE TO RELATED APPLICATIONS

This application claims priority of Taiwan Application No. 103100330, filed on Jan. 6, 2014, the entirety of which is incorporated by reference herein.

BACKGROUND OF THE INVENTION

Field of the Invention

The invention relates to a system and methods for protecting correct data, and more particularly to a system and methods for protecting correct data in a memory chip.

Description of the Related Art

Recently, more kinds of different electronic products are being developed, such as cellular phones, tablet computers, MP3 players, portable hard disks, Global Positioning System (GPS) receivers, digital cameras, hand-held gaming devices, and others. These electronic products are usually equipped with memory devices for storing essential data required for supporting system operations, recording user information, etc. . . .

The essential data is very important data that is required for the system to activate and initiate the host and makes the electronic device to function normally. In order to avoid damaged data in the memory device causing the electronic device to be unable to successfully activate, a system and methods for effectively protecting correct data are required.

BRIEF SUMMARY OF THE INVENTION

Memory chips and data protection methods are provided. An exemplary embodiment of a memory chip coupled to a host includes a memory and a controller. A plurality of boot images having the same content are pre-loaded in the memory. The controller is coupled to the memory for processing data transmission between the memory chip and the host. The controller further determines whether the memory chip enters a boot mode for the first time. When the memory chip enters the boot mode for the first time, the controller accesses the memory to obtain a correct boot image from the boot images and transmits the correct boot image to the host.

An exemplary embodiment of a data protection method includes: pre-loading a plurality of boot images in a memory chip, wherein the boot images have the same content; determining whether the memory chip enters a boot mode for the first time; obtaining a correct boot image from the boot images when the memory chip enters the boot mode for the first time; and transmitting the correct boot image to a host coupled to the memory chip.

Another exemplary embodiment of a data protection method includes: determining whether a memory chip enters a boot mode; determining whether the memory chip has pre-loaded a plurality of boot images with the same content; obtaining a correct boot image from the boot images when the memory chip enters the boot mode and has pre-loaded the boot images with the same content; and transmitting the correct boot image to a host coupled to the memory chip.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
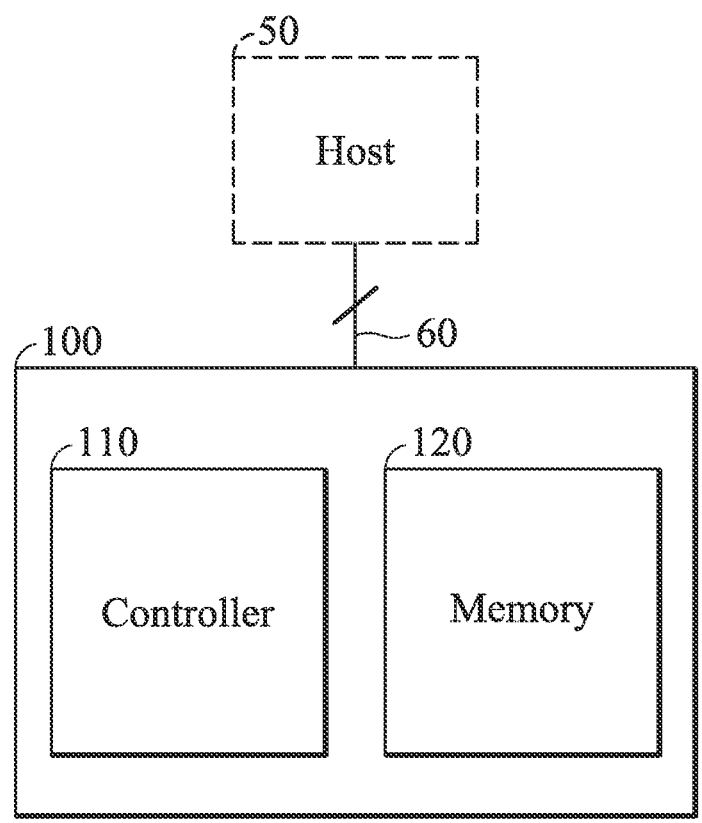
FIG. 1 shows a block diagram of a memory chip according to an embodiment of the invention.

FIG. 1 shows a block diagram of a memory chip according to an embodiment of the invention. The memory chip 100 may include a memory 120 and a controller 110 controlling data transmission between the memory chip 100 and the host 50. According to an embodiment of the invention, the controller 110 and the memory 120 may respectively be a controller die and a memory die, and are packaged in the memory chip 100. The memory chip 100 may be coupled to a host 50 via an interface 60. Note that in order to clarify the concept of the invention, FIG. 1 presents a simplified block diagram, in which only the elements relevant to the invention are shown. However, it is well-known in the art that the memory chip may further include other devices or circuits not shown in FIG. 1. Therefore, the invention should not be limited what is shown in FIG. 1. The memory chip 100 and the host 50 may be installed in the client side or configured in an electronic device, and may be integrated with the hardware and software/firmware of the electronic device as a system. In the embodiments of the invention, the electronic device may be a mobile communications device, a tablet computer, an MP3 player, a portable hard disk, a GPS receiver, a digital camera, a hand-held gaming device, or others.

When manufacturing the memory chip 100, important data assigned by the client is usually pre-loaded into the memory 120 through the external computer device (not shown in the figures) and the machine or the system tool at the factory side, and then the memory chip 100 is welded on the printed circuit board. The important data pre-loaded in the memory die may include a boot image (also called boot code). The boot image includes a plurality of software or firmware programs and important system parameters, such that the host 50 coupled to the memory chip 100 can initiate the host 50 itself and some other hardware devices in the electronic device according to the boot image, or drive the memory chip 100 and the hardware devices in the host 50 according to the boot image, to make the host 50 have basic input/output capability. For example, the host 50 may have the basic capability of accessing and controlling the memory chip 100 and other hardware devices. The host 50 may be included in the electronic device. For example, the host 50 may be a micro controller unit (MCU) included in the electronic device, or it may be independent from the electronic device, such with an external computer device coupled in the factory.

Generally, before welding the memory chip 100 on the printed circuit board, a boot image is pre-loaded or burned in the memory 120. Next, the memory chip 100 is welded on the printed circuit board. However, bit errors usually occur in the single boot image due to the high temperature environment when welding. When the number of error bits is large, the boot image is regarded as damaged, causing the memory chip 100 and even the host 50 coupled to the memory chip 100 to be unable to be activated. To solve this problem, systems and data protection methods for effectively protecting correct data are provided.

Referring back to FIG. 1, the memory 120 may include a plurality of pre-loaded boot images. According to an embodiment of the invention, each boot image may have the same content. The controller 110 coupled to the memory 120 may process the data transmission between the memory chip 100 and the host 50. In addition, the controller 110 may determine whether the memory chip 100 enters a boot mode for the first time. When the memory chip 100 enters the boot mode for the first time, the controller 110 may access the memory 120, obtain a correct boot image from the boot images and transmit the correct boot image to the host 50.

Figure 2:
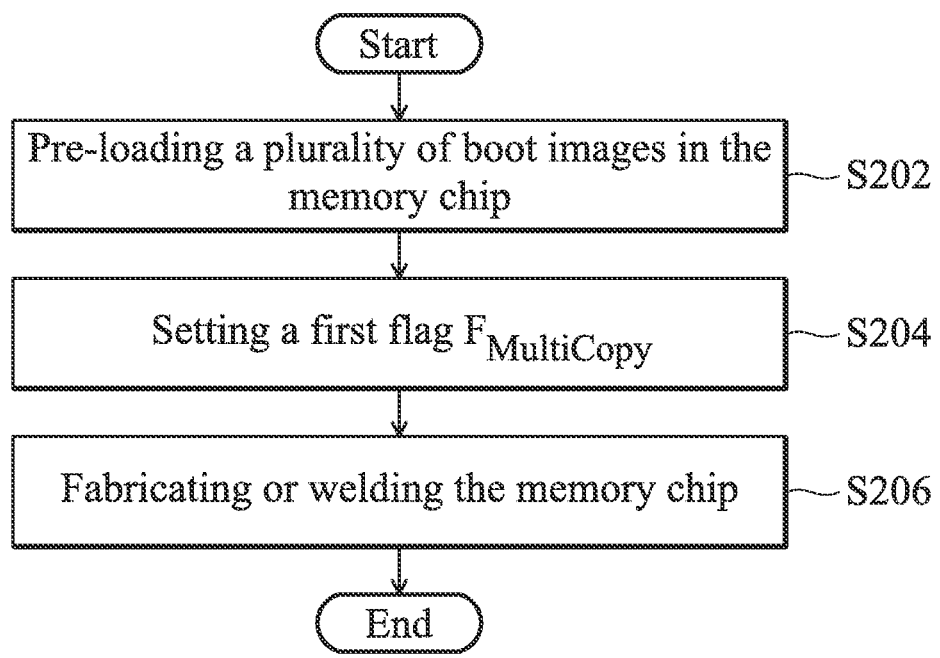
FIG. 2 shows a flow chart of a method for burning the boot image according to an embodiment of the invention.

FIG. 2 shows a flow chart of a method for burning the boot image according to an embodiment of the invention. According to an embodiment of the invention, when manufacturing the memory chip 100, the manufacturer may pre-load a plurality of boot images in the memory 120 of the memory chip 100 (Step S202). According to an embodiment of the invention, to protect the content of the boot image, the pre-loaded boot images may have the same content. That is, besides the original boot image, the memory 120 may further store more than one backup boot image. Next, the manufacturer may set a first flag $F_{MultiCopy}$ for indicating that the memory chip stores a plurality of boot images with the same content (Step S204). For example, the manufacturer may set the first flag $F_{MultiCopy}=1$ and store the first flag $F_{MultiCopy}$ in the memory 120. Next, the manufacturer may fabricate or weld the memory chip 100 according to the client's requirements (Step S206). For example, welding the memory chip 100 on the printed circuit board.

When the memory chip 100 is fabricated, the memory chip 100 may further be installed or configured in an electronic device at the client side. When the electronic device is powered, the controller 110 in the memory chip 100 may load the boot image according to the proposed data protection method to solve the problem of being unable to activate the memory chip 100 and even the electronic device equipping the memory chip 100, due to too many error bits.

Figure 3:
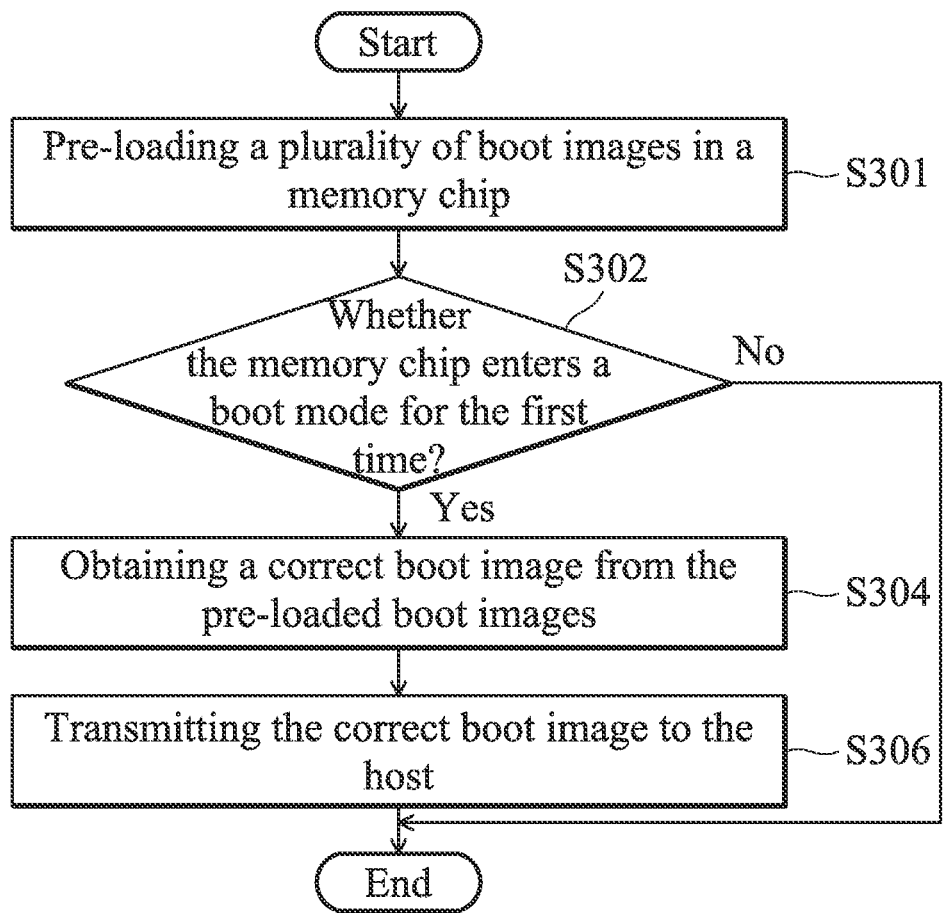
FIG. 3 shows a flow chart of a data protection method according to an embodiment of the invention.

FIG. 3 shows a flow chart of a data protection method according to an embodiment of the invention. First of all, a plurality of boot images are pre-loaded in a memory chip 100 (Step S301). Note that step S301 is usually performed before welding the memory chip 100 on the printed circuit board. After welding and coupling the memory chip to the host 50, the memory chip 100 performs the steps following from step S302. When the electronic device is powered, it is determined whether the memory chip 100 enters the boot mode for the first time (Step S302). If yes, a correct boot image is obtained from the pre-loaded boot images (Step S304). Next, the correct boot image is transmitted to the host 50 (Step S306). If not, the data protection method is not performed.

According to an embodiment of the invention, in step S302, the controller 302 may determine whether the memory chip 100 enters the boot mode according to a waveform of a signal transmitted on the interface 60. When the waveform of the signal matches a predetermined waveform defined by the corresponding standards, it is determined that the memory chip enters the boot mode. In an embodiment of the invention, the memory chip 100 may be an embedded MultiMediaCard (eMMC) chip conforming to the embedded memory standards defined by the MultiMediaCard Association (MMCA). The eMMC chip 100 may be coupled to the host 50 via an eMMC interface 60. Before the host 50 completes a boot procedure, the host 50 is unable to give a complete data access command to the memory chip 100 to obtain the boot image from the memory chip 100 for preforming a subsequent boot procedure. However, the host may transmit a predetermined voltage or signal waveform on one or more specific pins of the eMMC interface 60 so that the eMMC chip 100 may enter the eMMC boot mode according to the voltage or signal waveform. In the eMMC boot mode, the eMMC chip 100 may actively provide the boot image to the host 50. In addition, in step S302, when the memory chip 100 enters the boot mode according to the signal waveform on the interface 60, whether the memory chip 100 enters the boot mode for the first time may be determined according to whether a first flag is set. In one embodiment, the first flag may be the first flag set in step S204 in FIG. 2 (for example, by setting $F_{MultiCopy}=1$). When the memory chip 100 enters the boot mode for the first time and transmits the correct boot image to the host 50 (Step S306), the memory chip 100 may further clear the first flag (for example, by setting $F_{MultiCopy}=0$). That is, when the memory chip 100 is activated again at some time later, the first flag is cleared. According to another embodiment of the invention, in step S302, the controller 110 may further determine whether the memory chip 100 enters the boot mode for the first time only according to the first flag $F_{MultiCopy}$ stored in the memory 120.

Figure 4:
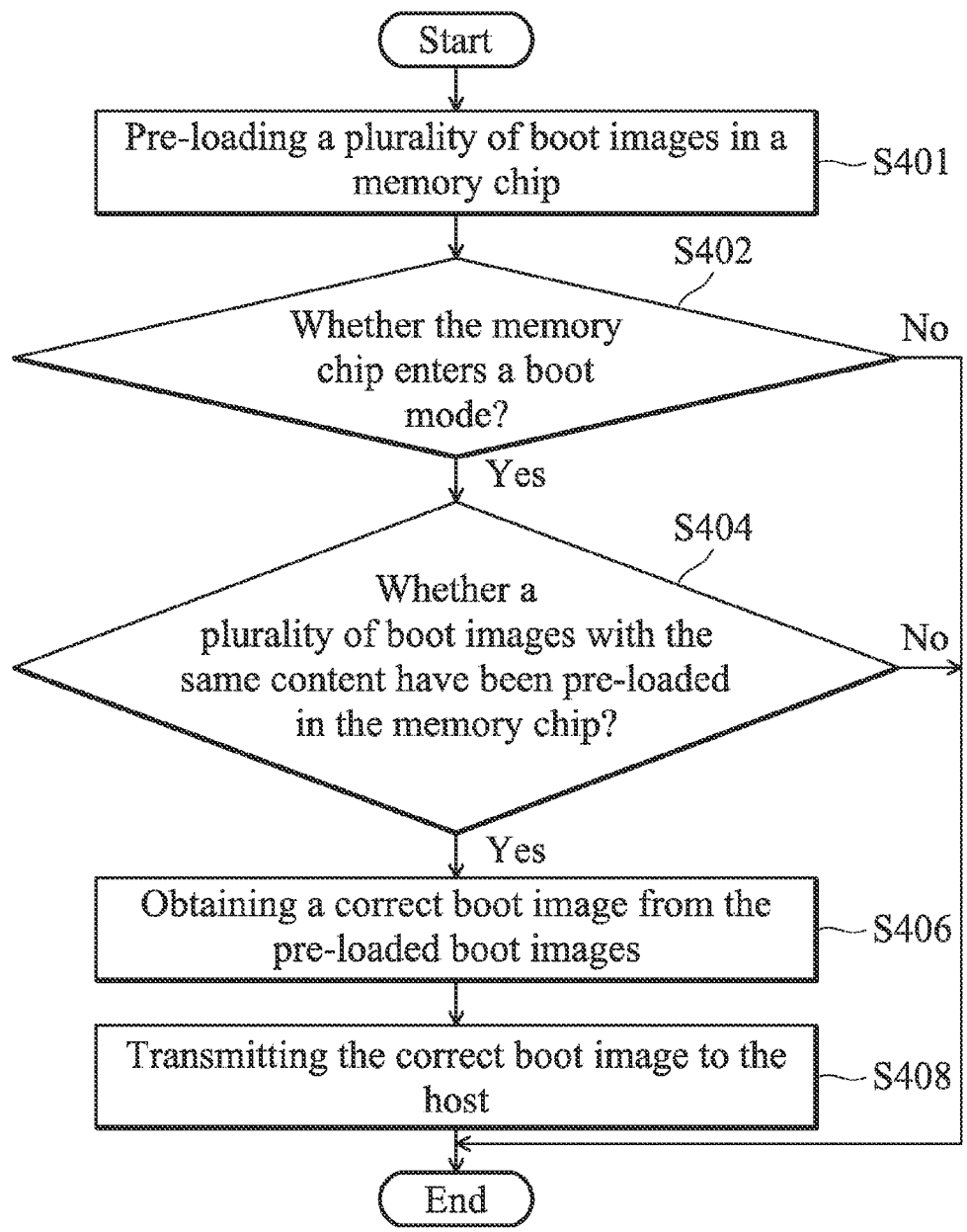
FIG. 4 shows a flow chart of a data protection method according to another embodiment of the invention.

FIG. 4 shows a flow chart of a data protection method according to another embodiment of the invention. First of all, a plurality of boot images are pre-loaded in a memory chip 100 (Step S401). Similar to step S301, step S401 is usually performed before welding the memory chip 100 on the printed circuit board. After welding and coupling the memory chip 100 to the host 50, the memory chip 100 performs the steps following from step S402. When the electronic device is powered up, it is determined whether the memory chip 100 enters the boot mode (Step S402). If yes, it is further determined whether a plurality of boot images with the same content have been pre-loaded in the memory chip 100 (Step S404). If yes, a correct boot image is obtained from the pre-loaded boot images (Step S406). Next, the correct boot image is transmitted to the host 50 coupled to the memory chip 100 (Step S408). If the memory chip 100 does not enter a boot mode or the memory chip 100 has not pre-loaded a plurality of boot images with the same content, the data protection method is not performed.

Compared with the embodiment as shown in FIG. 3, the only difference is that, in the embodiment shown in FIG. 4, it is determined whether the memory chip 100 has pre-loaded boot images according to the first flag instead of determining whether the memory chip 100 enters the boot mode for the first time. Note that another flag or variable can also be stored in the memory chip 100 for indicating whether the memory chip 100 has pre-loaded a plurality of boot images or whether the memory chip 100 enters the boot mode for the first time, and the invention should not be limited to any specific method of implementation.

Figure 5:
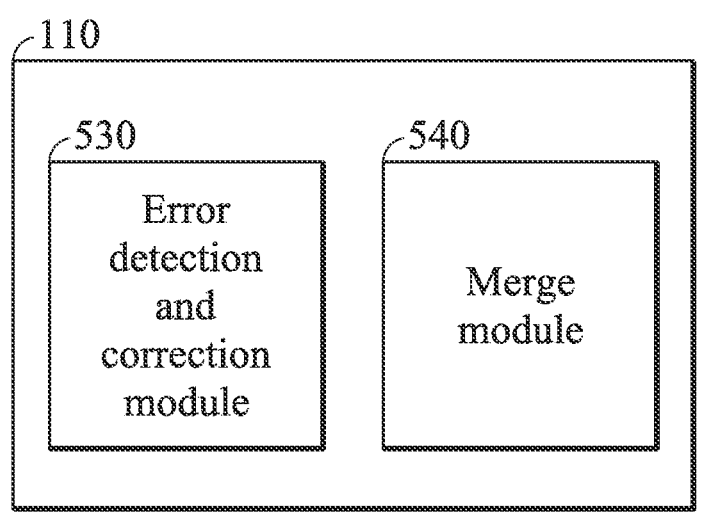
FIG. 5 shows a block diagram of a controller according to an embodiment of the invention.

FIG. 5 shows a block diagram of a controller according to an embodiment of the invention. According to an embodiment of the invention, the memory 120 stores data in data blocks. Therefore, the plurality of boot images pre-loaded in the memory 120 may include a plurality of data blocks. The controller 110 may include at least an error detection and correction module 530 and a merge module 540. The error detection and correction module 530 detects and corrects bit errors in the data stored in the memory 120. Generally, the error detection and correction module 530 may set a repairable threshold. The error detection and correction module 530 may detect a number of error bit(s) included in one data block according to a predetermined algorithm. When the number of error bit(s) included in one data block does not exceed the repairable threshold, the error detection and correction module 530 may be able to correct the error bit(s) included in this data block. The data block after error correction may still be regarded as a correct data block. However, when the number of error bit(s) included in one data block does exceeds the repairable threshold, the error detection and correction module 530 may be unable to correct the error bit(s) included in this data block. Therefore, the data block may be regarded as a damaged data block. The merge module 540 may load correct data blocks from one or more of the boot images to obtain the correct boot image. In another embodiment of the invention, the merge module 540 may further perform a merge operation. That is, merging the correct data blocks obtained from the one or more of the pre-loaded boot images to form a boot image copy, and then store the boot image copy in the memory 120, where the content of the boot image copy is the same as the correct boot image transmitted to the host 50. In an embodiment of the invention, the controller 110 may set a second flag after obtaining the correct boot image. When the memory chip 100 operates in an idle state, the merge module 540 further merges the correct data blocks according to the second flag, and clears the second flag after the boot image copy is formed. In addition, note that in order to clarify the invention, FIG. 5 presents a simplified block diagram, in which only the elements relevant to the invention are shown. However, the controller 110 may include other devices or circuits not shown in FIG. 5, and the invention should not be limited what is shown in FIG. 5.

The proposed data protection methods will be discussed further in the following flow charts.

Figure 6:
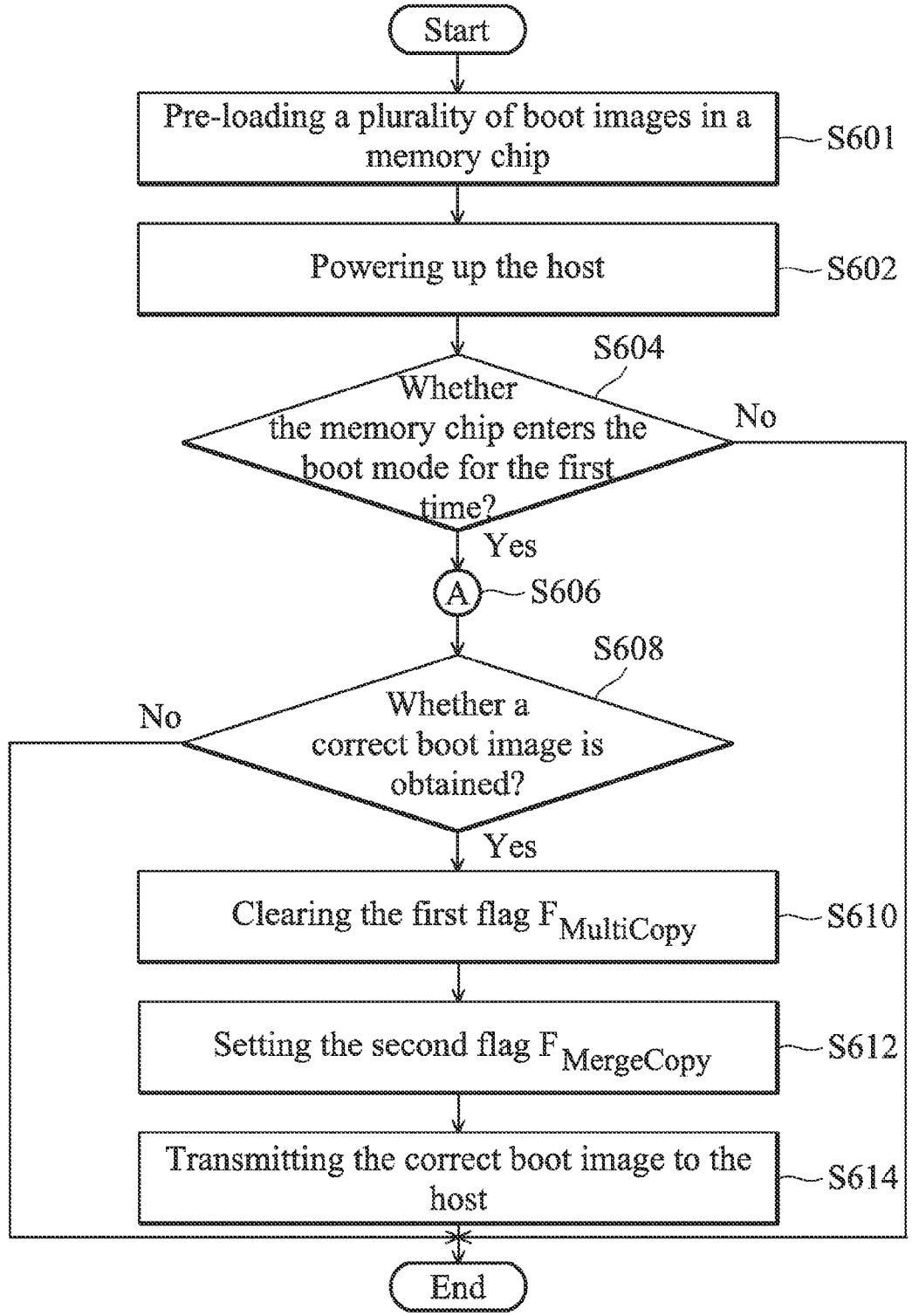
FIG. 6 shows a flow chart of a data protection method according to another embodiment of the invention.

FIG. 6 shows a flow chart of a data protection method according to another embodiment of the invention. Please refer to both FIG. 2 and FIG. 6. First of all, a plurality of boot images are pre-loaded in the memory chip 100 (Step S601). Note that the step S601 is usually performed before welding the memory chip 100 on the printed circuit board. After welding and coupling the memory chip 100 to the host 50, the memory chip 100 performs the steps following from step S602. When the electronic device is powered, the host 50 is powered up (Step S602). Next, the controller 110 of the memory chip 100 may determine whether the memory chip 100 enters the boot mode for the first time (Step S604). If yes, the controller 110 executes the procedure A for obtaining a correct boot image from the pre-loaded boot images (Step S606). According to an embodiment of the invention, the controller 110 may load the correct data blocks from one or more boot images to obtain a correct boot image. The procedure A will be further described in FIG. 7. After the procedure A is ended, the controller 110 may further determine whether a correct boot image is obtained (Step S608). If yes, the controller 110 may clear the first flag $F_{MultiCopy}$ (Step S610). For example, setting $F_{MultiCopy}$=0. Next, the controller may further set and store a second flag $F_{MergeCopy}$ in the memory 120 (Step S612). For example, setting $F_{MergeCopy}$=1. According to an embodiment of the invention, the second flag $F_{MergeCopy}$ indicates whether to perform the merge operation on the pre-loaded boot images. The merge operation is further discussed in the following paragraphs. Next, the controller 110 may further transmit the correct boot image to the host 50 (Step S614). On the other hand, if the memory chip 100 does not enter the boot mode for the first time, or cannot obtain a correct boot image in the procedure A, the flow is ended.

Note that in the embodiments of the invention, the sequence of performing the steps S610, S612 and S614 may be flexibly adjusted, and the invention should not be limited to any specific method of implementation.

Figure 7:
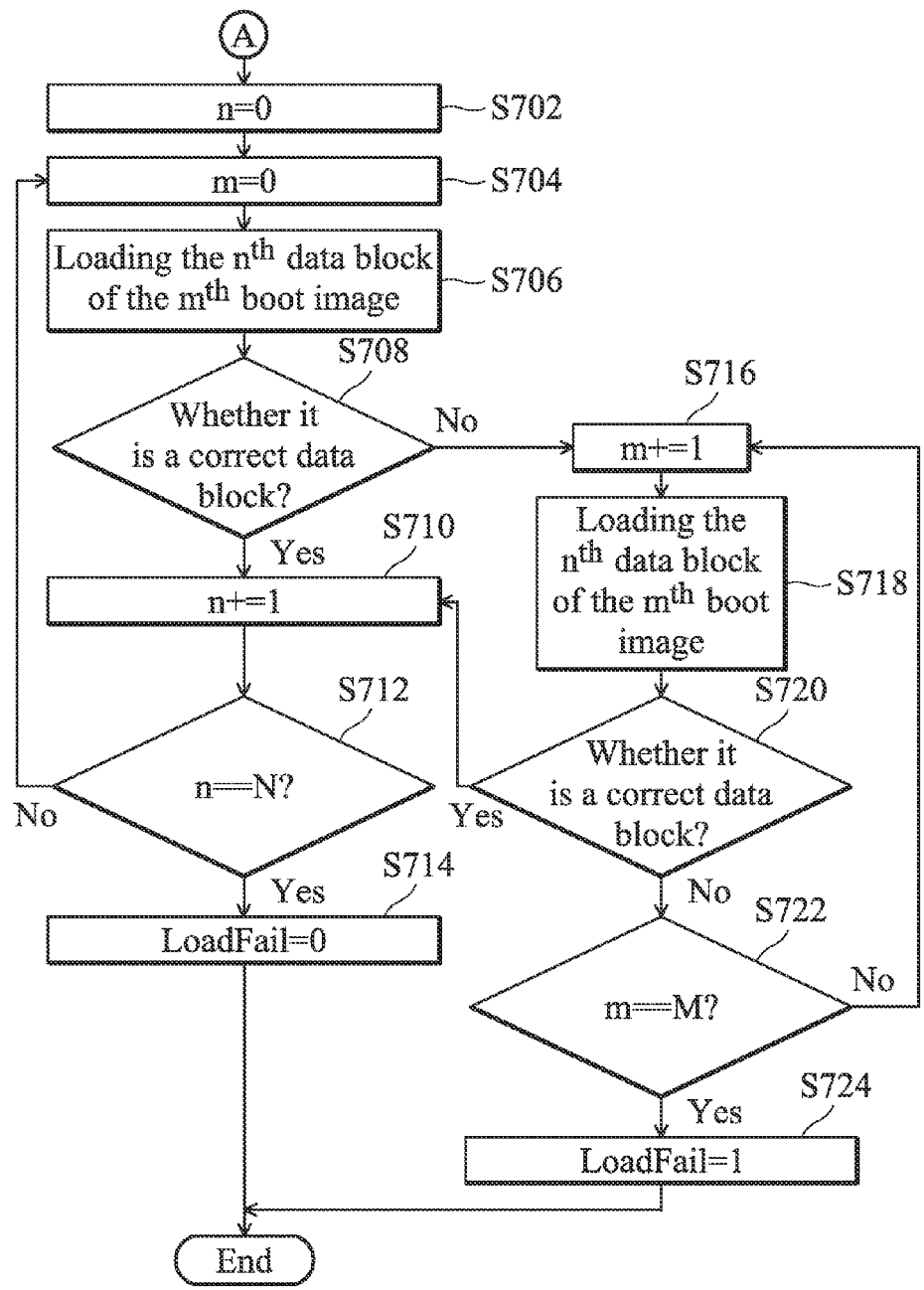
FIG. 7 shows a flow chart of a method for obtaining a correct boot image according to an embodiment of the invention.

FIG. 7 shows a flow chart of a method for obtaining a correct boot image according to an embodiment of the invention. Please refer to both FIG. 5 and FIG. 7. According to an embodiment of the invention, suppose that the memory 120 stores M copies of boot images with the same content, where M is a positive integer greater than 1 and the each boot image may respectively include N data blocks, where N is a positive integer. When procedure A begins, the controller 110 may first set the variable n=0 (Step S702) and set the variable m=0 (Step S704). Next, the controller 110 may access the memory 120 to load the $n^{th}$ data block of the $m^{th}$ boot image (Step S706). Next, the controller 110 may determine whether the $n^{th}$ data block of the $m^{th}$ boot image is a correct data block (Step S708). As discussed above, the controller 110 may determine whether it is a correct data block according to the detection result of the error detection and correction module (for example, the error detection and correction module 530).

When the $n^{th}$ data block of the $m^{th}$ boot image is a correct data block (the yes path of step S708), the controller may increase the variable n by 1 (Step S710). Next, the controller 110 may determine whether all of the data blocks in the $m^{th}$ boot image have been checked. For example, the controller 110 may determine whether the variable n equals to N (Step S712). If not, the procedure returns to step S704, in which the controller 110 may set the variable m=0 and then access the memory 120 to load the $n^{th}$ data block of the $m^{th}$ boot image in step S706. If the controller 110 determines that all the correct data blocks have been loaded (the yes path of step S712), the controller may set the variable LoadFail=0 (Step S714), which means that the controller 110 successively obtains the correct boot image.

On the other hand, when the $n^{th}$ data block of the $m^{th}$ boot image is not a correct data block (the no path of step S708), the controller 110 increases the variable m by 1 (Step S716). Next, the controller 110 may access the memory 120 to load the $n^{th}$ data block of the $m^{th}$ boot image (Step S718). Next, the controller 110 may determine whether the $n^{th}$ data block of the $m^{th}$ boot image is a correct data block (Step S720). As discussed above, the controller 110 may determine whether it is a correct data block according to the detection result of the error detection and correction module (for example, the error detection and correction module 530).

When the $n^{th}$ data block of the $m^{th}$ boot image is a correct data block, the procedure returns to step S710 for the controller 110 to increase the variable n. When the $n^{th}$ data block of the $m^{th}$ boot images is not a correct data block, the controller 110 may further determine whether all of the M boot image have been checked. For example, the controller 110 may determine whether the variable m equals to M (Step S722). If not, the procedure returns to step S716 for the controller 110 to increase the variable m. When all of the M boot images have been checked, because the controller 110 is unable to successively obtain a correct boot image at this time, the controller 110 may set the variable LoadFail=1 (Step S724), which means that the controller 110 cannot successively obtain the correct boot image.

Note that although in the flow chart shown in FIG. 7, the controller 110 returns to the first boot image to load the subsequent data block after obtaining a correct data block from the other boot image (for example, after the controller 110 determines that the $n^{th}$ data block of the $m^{th}$ boot image is a correct data block in step S720, the procedure returns to step S710 for the controller 110 to increase the variable n and then returns to the step S704 for the controller 110 to set the variable m=0, so as to load the subsequent data block from the first boot image), the invention should not be limited thereto. For example, in other embodiments of the invention, when the controller 110 determines that the $n^{th}$ data block of the $m^{th}$ boot image is a correct data block in step S720, the controller 110 may stay in the $m^{th}$ boot image to load the subsequent data block. Therefore, the invention should not be limited to what is shown in FIG. 7. In addition, the controller 110 does not have to browse each boot image in order. The controller 110 may also randomly search for correct data blocks from the M boot images according to other control mechanisms and therefore, the invention should not be limited to the methods as discussed above.

When the controller 110 successfully obtains the correct boot image, the host 50 may receive the correct boot image from the memory chip 100 and execute the received boot image to complete the predetermined boot procedure. Then, the host 50 may function normally. According to an embodiment of the invention, the controller 110 may further perform a merge operation on the boot images with the same content after the host 50 functions normally so as to keep a correct boot image copy and erase the remaining duplicated boot images. For example, the controller 110 may perform the merge operation via the merge module (for example, the merge module 540).

Figure 8:
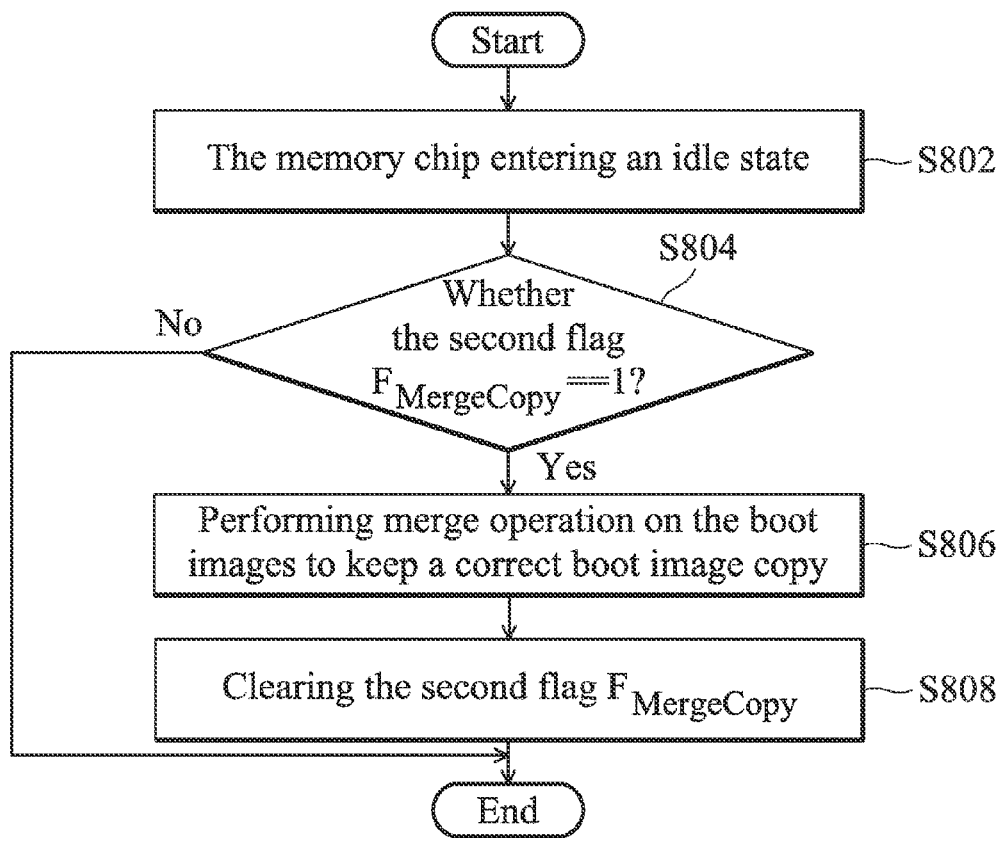
FIG. 8 shows a flow chart of a merge operation according to an embodiment of the invention.

FIG. 8 shows a flow chart of a merge operation according to an embodiment of the invention. When the memory chip 100 operates in an idle state (Step S802), the controller 110 may determine whether the second flag $F_{MergeCopy}$ is set (Step S804). For example, the controller 110 may determine whether the second flag $F_{MergeCopy}$=1. In an embodiment of the invention, when determining that the interface 60 coupled between the host 50 and the memory chip 100 is idle, the memory chip 100 operates in an idle state. As discussed above, the second flag $F_{MergeCopy}$ may be set in step S612 to indicate that the merge operation on the pre-loaded boot images is required. When the second flag $F_{MergeCopy}$ is set, the controller 110 may perform the merge operation on the boot images with the same content so as to keep a correct boot image copy (Step S806). On the other hand, when the controller 110 determines that the second flag $F_{MergeCopy}$ is not set in step S804, it means that the merge operation is not required. Finally, the controller 110 may clear the second flag $F_{MergeCopy}$, for example, by setting $F_{MergeCopy}$=0 (Step S808). After the merge operation, the correct boot image copy is stored in the memory 120 and the remaining duplicated boot images are erased.

Figure 9:
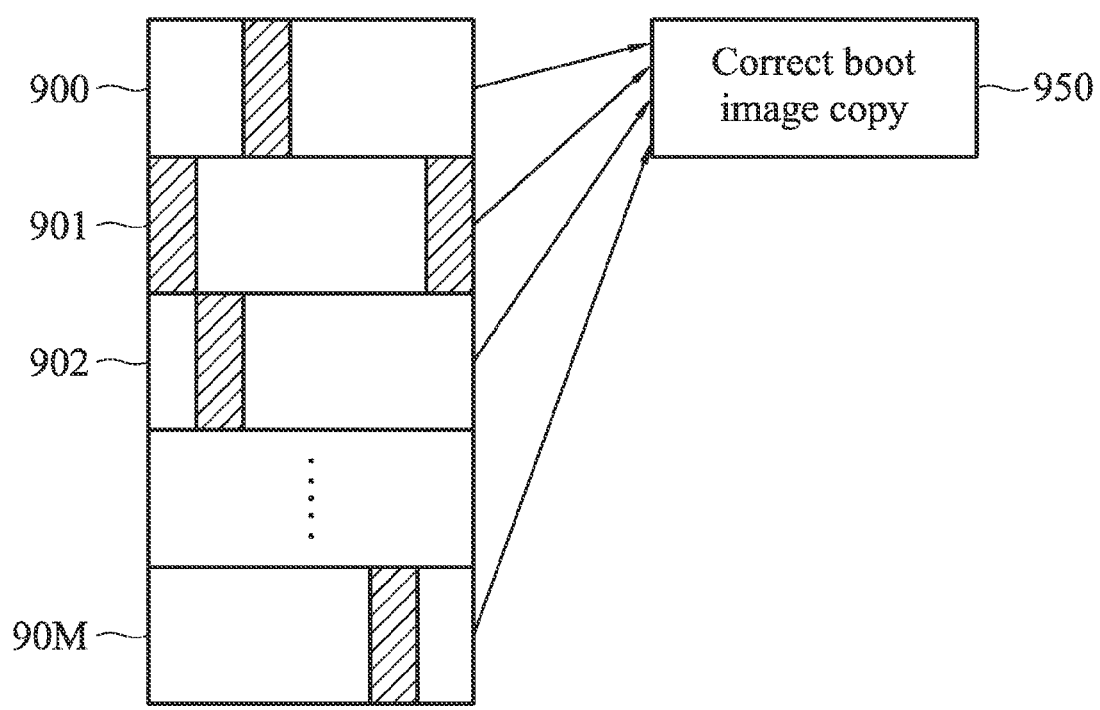
FIG. 9 is a schematic diagram showing the merge operation according to an embodiment of the invention.

FIG. 9 is a schematic diagram showing the merge operation according to an embodiment of the invention. The boot images before performing the merge operation are shown on the left-side of FIG. 9 and the correct boot image copy obtained after performing the merge operation is shown on the right-side of FIG. 9. The boot image 900 may be the original boot image and the boot images 901, 902 . . . 90M may be the copies of the boot image 900. In other words, the boot images 900~90M may have the same content. During the merge operation, the correct data blocks (such as the blocks with slashes shown in FIG. 9) in one or more boot images may be collected and merged by the controller 110 to form a correct boot image copy 950.

In the embodiments of the invention, the problem of having excessive error bits in the boot image due to the high temperatures of welding, which can cause the memory chip and even the host coupled to the memory chip 100 to be unable to be activated, can be effectively solved through the data protection methods as discussed above.

The embodiments of the present invention can be implemented in any of numerous ways. For example, the embodiments may be implemented using hardware, software or a combination thereof. It should be appreciated that any component or collection of components that perform the functions described above can be generically considered as one or more processors that control the function discussed above. The one or more processors can be implemented in numerous ways, such as with dedicated hardware, or with general-purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A memory chip, coupled to a host, comprising:
   a memory, pre-loading a plurality of boot images, wherein the boot images have the same content; and
   a controller, coupled to the memory, processing data transmissions between the memory chip and the host, wherein the controller further determines whether the memory chip enters a boot mode for the first time according to a first flag, and when the memory chip enters the boot mode for the first time, the controller accesses the memory to obtain a correct boot image from the boot images and transmits the correct boot image to the host.

2. The memory chip as claimed in claim 1, wherein the memory chip is coupled to the host via an interface, the controller determines whether the memory chip enters the boot mode for the first time further according to a waveform of a signal transmitted by the host on the interface, and when the waveform of the signal matches a predetermined waveform and when the first flag is set, the controller determines that the memory chip enters the boot mode for the first time.

3. The memory chip as claimed in claim 1, wherein the first flag indicates whether the memory stores a plurality of boot images with the same content.

4. The memory chip as claimed in claim 1, wherein when the memory chip enters the boot mode for the first time and when the correct boot image is obtained, the controller clears the first flag.

5. The memory chip as claimed in claim 1, wherein each boot image comprises a plurality of data blocks, the controller loads a plurality of correct data blocks from one or more of the boot images to obtain the correct boot image.

6. The memory chip as claimed in claim 5, wherein the controller comprises:
   an error detection and correction module, detecting and correcting error bit(s) in the boot images,
   wherein during a process of accessing the memory, when the error detection and correction module detects that a number of error bit(s) comprised in one of the data blocks does not exceed a repairable threshold, the data block is regarded as a correct data block.

7. The memory chip as claimed in claim 1, wherein each boot image comprises a plurality of data blocks, and the controller comprises:
   a merge module, merging correct data blocks of the boot images to form a boot image copy, and storing the boot image copy in the memory.

8. The memory chip as claimed in claim 7, wherein the controller sets a second flag after obtaining the correct boot image, and when the memory chip operates in an idle state, the merge module further merges the correct data blocks to form the boot image copy according to the second flag, and clears the second flag after the boot image copy is formed.

9. The memory chip as claimed in claim 8, wherein the memory chip is coupled to the host via an interface, and when the interface is idle, the memory operates in the idle state.

10. A data protection method, comprising:
    pre-loading a plurality of boot images in a memory chip, wherein the boot images have the same content;
    determining whether the memory chip enters a boot mode for the first time according to a first flag;
    obtaining a correct boot image from the boot images when the memory chip enters the boot mode for the first time; and
    transmitting the correct boot image to a host coupled to the memory chip.

11. The method as claimed in claim 10, wherein the memory chip is coupled to the host via an interface, and when a waveform of a signal transmitted by the host on the interface matches a predetermined waveform and when the first flag is set, the memory chip is determined as entering the boot mode for the first time.

12. The method as claimed in claim 10, wherein the first flag indicates whether the memory stores a plurality of boot images with the same content.

13. The method as claimed in claim 10, further comprising:
    clearing the first flag when the memory chip enters the boot mode for the first time and when the correct boot image is obtained.

14. The method as claimed in claim 10, wherein each boot image comprises a plurality of data blocks, and the step of obtaining the correct boot image from the boot images further comprises:
    determining whether the data blocks of one or more of the boot images are correct; and
    loading a plurality of correct data blocks from one or more of the boot images to obtain the correct boot image.

15. The method as claimed in claim 14, wherein the step of determining whether the data blocks of one or more of the boot images are correct further comprises:
    detecting a number of error bit(s) comprised in one of the data blocks; and
    regarding the data block as a correct data block when the number of error bit(s) comprised in the data block does not exceed a repairable threshold.

16. The method as claimed in claim 10, further comprising:
    merging a plurality of correct data blocks of the boot images to form a boot image copy; and
    storing the boot image copy in the memory chip.

17. The method as claimed in claim 16, further comprising:
    setting a second flag after obtaining the correct boot image;
    merging the correct data blocks according to the second flag when the memory chip operates in an idle state; and
    clearing the second flag after the boot image copy is formed.

18. A data protection method, comprising:
    determining whether a memory chip enters a boot mode for the first time according to a first flag;
    determining whether the memory chip has pre-loaded a plurality of boot images with the same content;
    obtaining a correct boot image from the boot images when the memory chip enters the boot mode and has pre-loaded the boot images with the same content; and
    transmitting the correct boot image to a host coupled to the memory chip.

* * * * *